(12) United States Patent
Zhou et al.

(10) Patent No.: US 10,027,977 B2
(45) Date of Patent: Jul. 17, 2018

(54) ENCODING METHOD FOR DISTRIBUTION OF MULTIMEDIA CONTENTS WITH ENFORCEMENT OF COMMERCIAL ADVERTISEMENT

(71) Applicant: Broadcom Corporation, Irvine, CA (US)

(72) Inventors: Minhua Zhou, San Diego, CA (US); Xuemin Chen, Rancho Santa Fe, CA (US); Peisong Chen, San Diego, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 687 days.

(21) Appl. No.: 14/083,436

(22) Filed: Nov. 18, 2013

(65) Prior Publication Data

US 2015/0110169 A1    Apr. 23, 2015

Related U.S. Application Data

(60) Provisional application No. 61/893,460, filed on Oct. 21, 2013.

(51) Int. Cl.
| | |
|---|---|
| *H04N 19/172* | (2014.01) |
| *H04N 19/177* | (2014.01) |
| *H04N 19/423* | (2014.01) |
| *H04N 19/433* | (2014.01) |
| *H04N 19/58* | (2014.01) |
| *H04N 19/573* | (2014.01) |
| *G09B 7/00* | (2006.01) |

(52) U.S. Cl.
CPC ............... *H04N 19/58* (2014.11); *G09B 7/00* (2013.01); *H04N 19/573* (2014.11)

(58) Field of Classification Search
None
See application file for complete search history.

(56) References Cited

U.S. PATENT DOCUMENTS

| | | | | |
|---|---|---|---|---|
| 9,176,656 | B1 * | 11/2015 | Bush | G06F 3/0483 |
| 2004/0103429 | A1 * | 5/2004 | Carlucci | H04N 7/163 |
| | | | | 725/32 |
| 2009/0097572 | A1 * | 4/2009 | Connery | G11B 27/034 |
| | | | | 375/240.26 |
| 2009/0210894 | A1 * | 8/2009 | Reckless | H04N 7/163 |
| | | | | 725/32 |

(Continued)

FOREIGN PATENT DOCUMENTS

GB           2396050 A  *  6/2004  ............. G11B 20/10

*Primary Examiner* — William C Vaughn, Jr.
*Assistant Examiner* — Joseph A Towe
(74) *Attorney, Agent, or Firm* — McDermott Will & Emery LLP

(57) ABSTRACT

Methods and systems for encoding multimedia content with enforcement of commercial advertisements are discussed in the disclosure. Some of the methods may require all or part of a commercial advertisement segment to be viewed and/or decoded in order to decode an entertainment segment. In some implementations, the disclosure provides for inserting commercial advertisements in a video stream. The various implementations discussed herein may require a viewer to watch all or part of a commercial segment in order to view an entertainment segment of multimedia content.

20 Claims, 11 Drawing Sheets

(56) References Cited

U.S. PATENT DOCUMENTS

| | | | |
|---|---|---|---|
| 2010/0150230 A1* | 6/2010 | Zhou | H04N 21/234381 375/240.12 |
| 2010/0262472 A1* | 10/2010 | Gautam | G06Q 30/02 705/14.1 |
| 2013/0114715 A1* | 5/2013 | Srinivasan | H04N 19/172 375/240.13 |
| 2013/0132727 A1* | 5/2013 | Petrovic | H04N 21/4627 713/176 |
| 2013/0223524 A1* | 8/2013 | Lu | H04N 19/187 375/240.12 |
| 2013/0268961 A1* | 10/2013 | Miles | H04N 21/23439 725/32 |
| 2014/0075469 A1* | 3/2014 | Zhao | H04N 21/4784 725/32 |
| 2014/0111512 A1* | 4/2014 | Huang | G06T 1/60 345/422 |
| 2014/0279852 A1* | 9/2014 | Chen | G06F 17/30023 707/609 |
| 2015/0016514 A1* | 1/2015 | Wang | H04N 19/46 375/240.08 |
| 2015/0067722 A1* | 3/2015 | Bjordammen | H04N 21/2625 725/32 |
| 2015/0110169 A1* | 4/2015 | Zhou | H04N 19/573 375/240.02 |

* cited by examiner

ENCODING METHOD FOR DISTRIBUTION OF MULTIMEDIA CONTENTS WITH ENFORCEMENT OF COMMERCIAL ADVERTISEMENT

CROSS REFERENCE TO RELATED APPLICATIONS

This application is a non-provisional of and claims the benefit of U.S. Provisional Patent Application No. 61/893,460 filed Oct. 21, 2013, entitled "An Encoding Method For Distribution Of Multimedia Content With Enforcement Of Commercial Advertisement" the content of which is hereby incorporated by reference in its entirety.

TECHNICAL FIELD

This disclosure relates to methods for distributing multimedia content with commercial content.

BACKGROUND

Innovations in multimedia distribution have made it possible to deliver multimedia content to an increasing number of viewers. Many sources of multimedia content are sponsored by advertisers. In exchange for sponsorship, advertisers may request viewers to watch commercial content to promote products and services. The disclosure provides methods for multimedia distribution that may require viewers to watch commercial content in order to access entertainment content.

DETAILED DESCRIPTION

The disclosure relates to methods for encoding multimedia content with enforcement of commercial advertisements. Some of the methods may require all or part of a commercial advertisement segment to be viewed and/or decoded in order to decode an entertainment segment. In some implementations, the disclosure provides for inserting commercial advertisements in a video stream. The various implementations discussed herein may require a viewer to watch all or part of a commercial segment in order to view an entertainment segment of multimedia content.

In some implementations, at least one reference picture may be inserted in a commercial segment. The reference picture may be referenced by at least one dependent picture in an entertainment segment. If a user skips the commercial before the at least one reference picture is viewed, the dependent picture of the entertainment segment may cause the entertainment content to be unwatchable. The failure in playback of the entertainment portion may be in response to reference information of the reference picture being unavailable for reconstruction of the dependent picture of the entertainment segment, and the following pictures in the entertainment portion may reference to the dependent picture for reconstruction.

In some implementations, at least one commercial segment may be incorporated into an adaptive bit-rate (ABR) stream. A commercial segment may comprise one or more reference pictures incorporated in a base layer of an ABR stream. One or more dependent pictures may be inserted in an entertainment portion of the base layer of the ABR stream. In order to decode and reconstruct the one or more dependent pictures in the ABR stream, the one or more reference pictures may first need to be stored to a memory. In this way, a viewer may be required to watch some or all of a commercial segment of multimedia content in order to view an entertainment segment of the multimedia content. The disclosure may provide for various implementations for enforcement of viewing commercial content.

Figure 1:
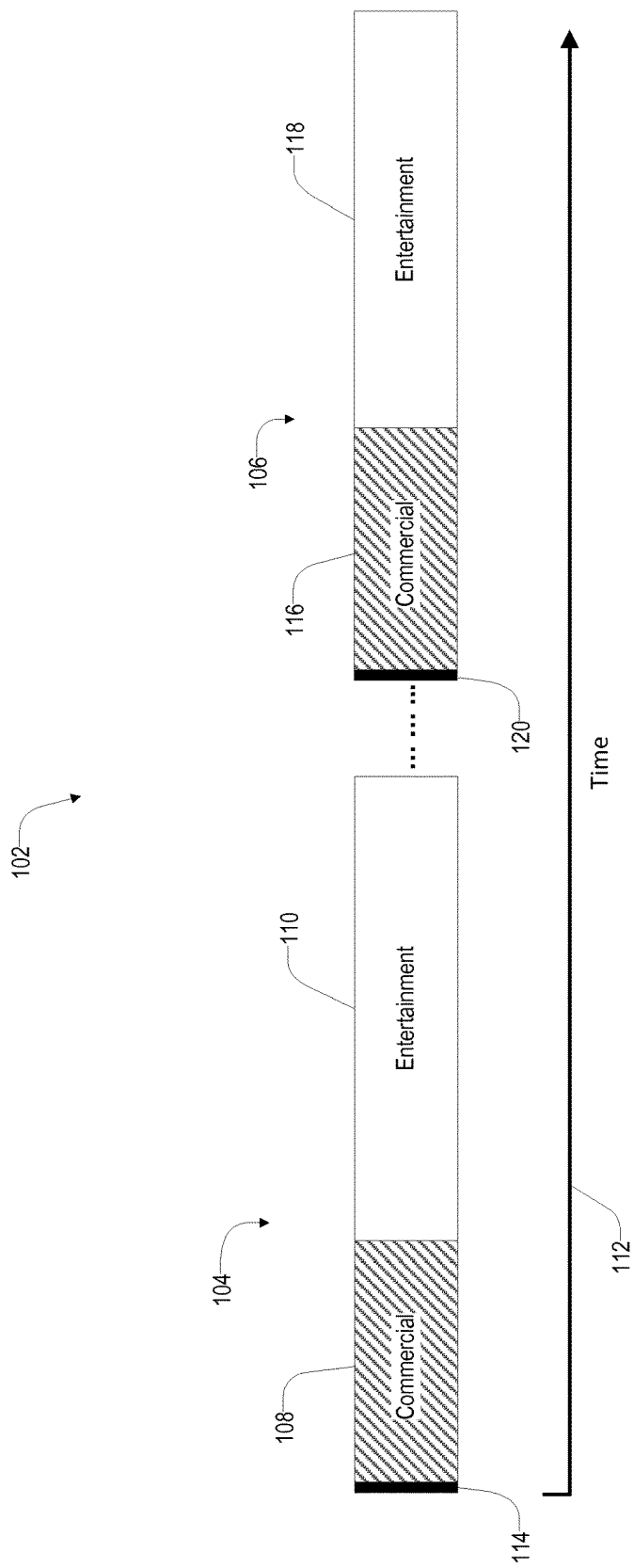
FIG. 1 is an example of a diagram illustrating a method of commercial enforcement in multimedia content.

FIG. 1 is an example of diagram illustrating a method of commercial enforcement in multimedia content 102 in accordance with the disclosure. The multimedia content 102 may comprise a first multimedia content segment 104 and a second multimedia content segment 106. The first multimedia content segment 104 may comprise a commercial segment 108 and an entertainment segment 110. In some implementations, the commercial segment 108 may be shown as appearing prior to the entertainment segment 110 along a timeline 112. In some examples, the commercial segment may follow an entertainment segment or a portion of an entertainment segment.

Multimedia content (e.g. multimedia content 102) as discussed herein may refer to any audio and/or video content. In some examples, multimedia content may comprise one or more multimedia titles, video titles, or any other audiovisual data. Multimedia content may further comprise a plurality of entertainment segments and commercial segments. Each commercial segment may comprise at least a portion of a commercial advertisement or a plurality of commercial advertisements in audio and/or video format. Each of the entertainment segments may comprise at least a portion of an audio and/or video title or a plurality of audio and/or video titles operable to be displayed for viewing.

In some implementations, a random access point (RAP) 114 may be inserted at the beginning of a commercial segment 108. The RAP 114 may be established by inserting an instantaneous decoding refresh (IDR) picture at the beginning of the commercial segment 108. The RAP 114 may also be established by inserting an intra-random access point at the beginning of the commercial segment 108. A RAP 114 may define a location of the first multimedia content segment 104 that may be accessed by a viewer to begin viewing the first multimedia content segment 104.

In some implementations, a viewer may be restricted from skipping a commercial content segment 108 of a multimedia content segment. For example, in order to access an entertainment segment (e.g. entertainment segment 110), a viewer may be required to view an entire commercial segment (e.g. commercial segment 108). An RAP (e.g. the RAP 114) may provide an access point to begin viewing a multimedia content segment. In some implementations, the RAP 114 may comprise a position defined by a reference picture or frame in the multimedia content that may be accessed for viewing.

Attempts to access other portions (e.g. any portion of the multimedia content which does not comprise a RAP) of the multimedia content may cause playback of the multimedia content to fail. A failure in playback of multimedia content may occur in response to attempting to access a picture that requires reference information that is unavailable for decoding and reconstruction. Information may be unavailable if a viewer has skipped a commercial segment. For example, an attempt to access a picture that requires reference information (e.g. a dependent picture) without previously decoding the reference information may cause a failure due to the reference information being inaccessible in a memory and/or buffer.

The second multimedia content segment 106 may comprise a commercial segment 116 and an entertainment segment 118. Similar to the first multimedia content segment 104, a RAP 120 may be inserted at the beginning of the commercial segment. Though the multimedia content 102 in this example is shown in the first multimedia content segment 104 and the second multimedia content segment 106, the number or quantity of multimedia content segments may vary.

Figure 10:
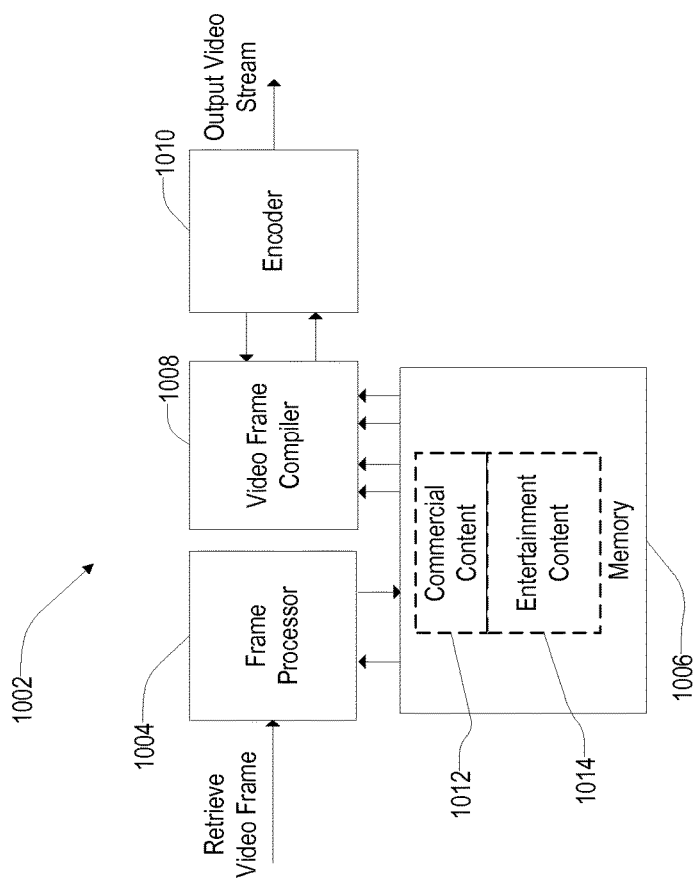
FIG. 10 is an example of a block diagram of a system for generating multimedia content with commercial enforcement.

The methods described herein may refer to various encoding and/or methods operable to generate a transport stream of multimedia content. In some implementations, the multimedia content may comprise a plurality of segments. Each of the segments may comprise at least one commercial segment and at least one entertainment segment. The number of multimedia content segments may depend on the length of a particular multimedia content title and a frequency of commercial segments. An exemplary system that may be operable to facilitate the methods discussed throughout the disclosure is shown in FIG. 10.

Encoding of a multimedia segment comprising at least one commercial segment and at least one entertainment segment as discussed herein may comprise a variety of encoding methods. Some encoding methods that may implement the methods discussed may include H.262/MPEG-2, H.263, MPEG-4, H.264/MPEG-4 AVC, VC-2 (Dirac) and H.265/MPEG HEVC. The encoding methods discussed may be applicable to a variety of media types and delivery methods, for example Video on Internet (DivX, Xvid, etc.), Blu-ray, DVD Digital Video Broadcasting, iPod Video, VC-2 (Dirac) HDTV broadcast, UHDTV, etc.

Figure 2:
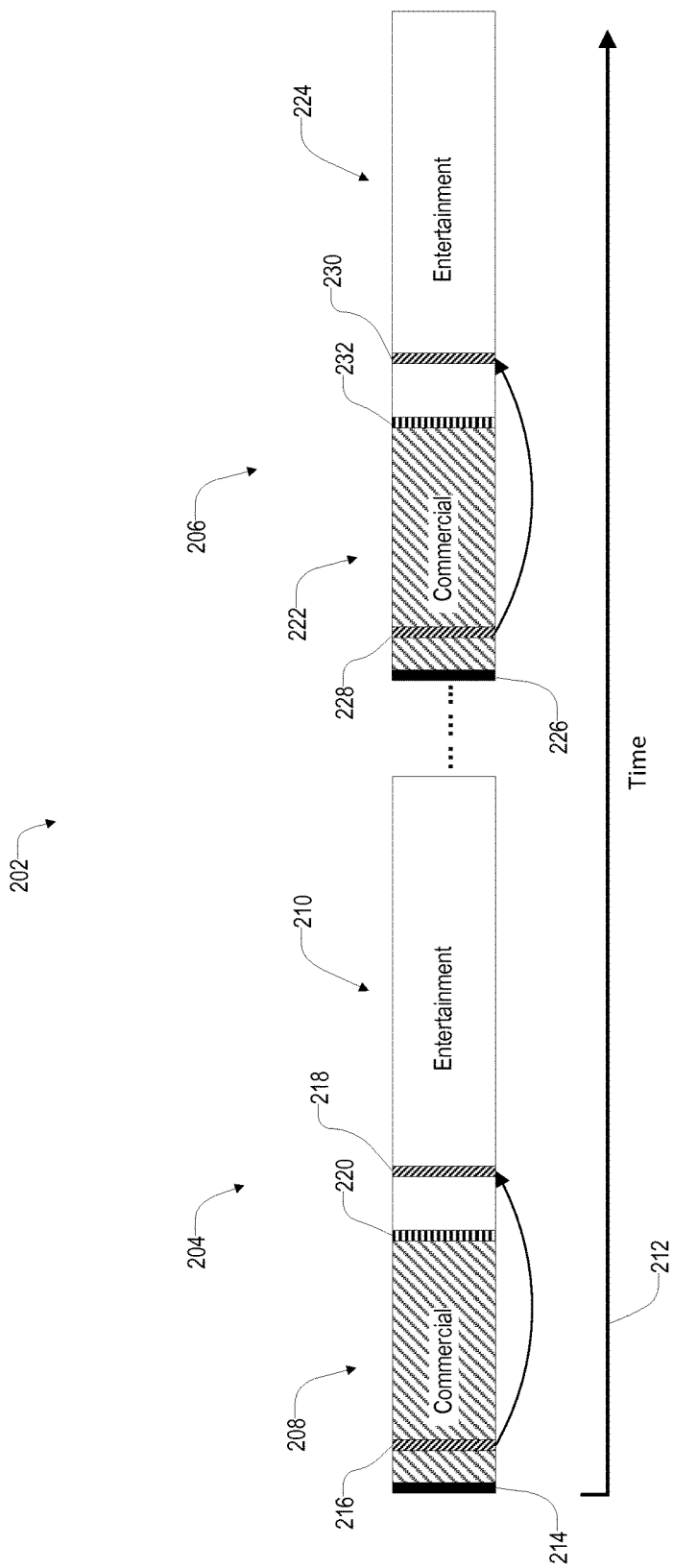
FIG. 2 is an example of a diagram illustrating a method of commercial enforcement in multimedia content.

FIG. 2 is an example of diagram illustrating a method of commercial enforcement in multimedia content 202 in accordance with the disclosure. The multimedia content 202 may comprise a first multimedia content segment 204 and a second multimedia content segment 206. The first multimedia content segment 204 may comprise a commercial segment 208 and an entertainment segment 210. In some implementations, the commercial segment 208 may be inserted prior to the entertainment segment 210 relative to a timeline 212. In some examples, the commercial segment may follow an entertainment segment or a portion of an entertainment segment.

Similar to the example of FIG. 1, a RAP 214 may be inserted at the beginning of the commercial segment 208. The RAP 214 may provide a playback location where a viewer may access the first multimedia content segment 204. In this example, a viewer may be required to watch the commercial segment 208 for a required period of time. The period of time required for viewing the commercial segment may be determined based on a position of insertion of a reference picture, for example the first long-term reference picture 216. The time that the user is required to watch the commercial segment 208 in FIG. 2 may be illustrated by a position of insertion of the first long-term reference picture 216 relative to the timeline 212.

The first long-term reference picture 216 may be referenced by one or more dependent pictures in the entertainment segment 210, for example the first dependent picture 218. When viewing the first multimedia content segment 204, the first dependent picture 218, may require reference information from the first long-term reference picture 216 for reconstruction of the first dependent picture 218 from a compressed form. For example, reference information from the first long-term reference picture 216 may be required to reconstruct the first dependent picture 218.

A long term reference picture may include reference information that may remain in a memory and/or buffer until the memory and/or buffer is cleared. For example, when decoding multimedia content, reference information may be cleared from memory when an intra-picture is decoded. A long-term reference picture may include reference information that may remain stored in memory after an intra-picture is decoded. In this way, reference information corresponding to a long-term reference picture may remain in memory and be referenced by one or more dependent pictures that may require the reference information for reconstruction after an intervening intra-picture has been decoded.

Attempts to reconstruct the first dependent picture 218 prior to decoding the first long-term reference picture 216 may interrupt playback of the first multimedia content segment 204. In some cases, attempts to reconstruct the first dependent picture 218 prior to decoding the long-term reference picture 216 may cause playback of the first multimedia content segment 204 to fail. The arrow shown extending from the first long term reference picture 216 to the first dependent picture 218 may demonstrate a dependence of the first dependent picture 218. Similar arrows may be used throughout the disclosure to demonstrate similar dependencies.

A first intra-coded picture (i-picture) 220 may be inserted at the beginning of the entertainment segment 210. The I-picture 220 may allow a viewer to skip a portion of the commercial segment 208. For example, an I-picture may serve as an access point in the first multimedia content segment 204 to skip a portion of the commercial segment 208. A long-term reference picture, for example the first long-term reference picture 216, may remain in a memory and/or a buffer of a decoding device until the memory/buffer is cleared. For example, a conventional reference picture may be cleared from a buffer in response to decoding the I-picture 220. A long-term reference picture may remain in the memory and/or buffer such that the long term reference picture may be referenced by one or more dependent pictures (e.g. first dependent picture 218).

By placing the I-picture 220 at the beginning of the entertainment segment 210, the first multimedia content segment 204 may be accessed by a viewer at the beginning of the entertainment segment 210. However, if the long-term reference picture 216 is not first decoded, playback of the first entertainment segment 210 may be interrupted in response to reaching the dependent picture 218. A duration of time required for viewing the commercial segment 208 may be dependent on an amount of time between the RAP 214 and the long-term reference picture 216 relative to the timeline 212.

A long-term reference picture may comprise an i-picture, dependent picture, or any other form of picture that may provide reference information to a picture decoded and/or reconstructed at a time after the long-term reference picture is decoded and/or displayed. An I-picture may refer to a picture or frame that may be reconstructed independently from other pictures or frames. A dependent picture may comprise any picture or frame that refers to other pictures or frames for reconstruction in decoding. For example, a dependent picture may comprise a predicted picture (P-picture) or a bi-predictive picture (B-picture).

In the example shown in FIG. 2, the dependent picture 218 may refer to the long term reference picture 216 for decoding. The other pictures or frames that follow the I-picture 220 relative to the timeline 212 may refer to the I-picture 220. Additional reference information may further be accessed from additional I-pictures, P-pictures, and/or B-pictures for reference information for reconstruction. An attempt to decode a dependent picture prior to decoding the long term reference picture 216 may result in a message displayed on a screen. For example, when attempting to reconstruct dependent picture 218, a viewer may be notified that an interruption in playback has occurred as a result of skipping a commercial segment. The message may further instruct a viewer to return to the beginning of a commercial segment to complete playback of the desired multimedia content.

A viewer of the multimedia content 202 may be notified that a commercial segment is required for viewing in a variety of ways. In some examples, a message may be included in a commercial segment warning a viewer that an attempt to skip commercial segment prior to a required viewing time may result in failure of playback of an entertainment segment of multimedia content. In some instances a message, subtitle, dialog box, symbol, timer, or any other notification may be displayed prior to or in conjunction with a commercial or entertainment segment of the multimedia content. For example, a viewer may be notified that skipping a commercial segment is not allowed while a message is displayed or until a time has elapsed. In this way, a viewer may be notified if and when a portion of a commercial segment may be skipped.

Figure 11:
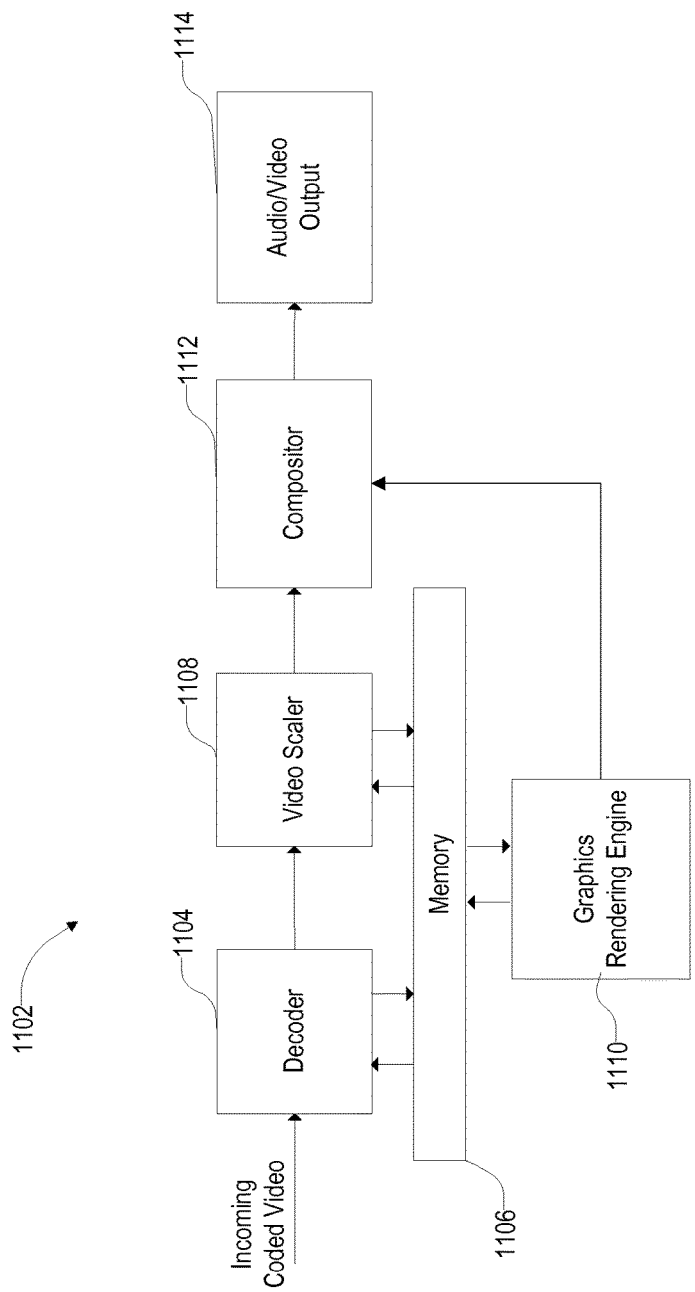
FIG. 11 is an example of a block diagram of a system for decoding multimedia content with commercial enforcement in accordance with the disclosure.

A notification that a commercial segment is required for viewing may be included in the pictures as delivered to a decoder. Such a notification may also be delivered as side information in a video stream delivered to a decoder system. Side information received by a system for decoding may be rendered by graphics processor and displayed during playback as rendered graphics. An example of a system that may be implemented for decoding and rendering of a video stream is shown in FIG. 11.

The second multimedia content segment 206 may comprise a commercial segment 222 and an entertainment segment 224. Similar to the first multimedia content segment 204 a RAP 226 may be inserted at the beginning of the commercial segment. A long-term reference picture 228 may also be inserted in the commercial segment. The long term reference picture 228 may include reference information that is required to reconstruct at least one dependent picture 230. The second multimedia content segment 206 may further comprise an I-picture 232. The I-picture 232 may provide an access point for a viewer to skip a portion of the commercial segment 222. Though the multimedia content 202 in this example is shown as first and second multimedia content segments 204 and 206, the number of multimedia content segments may vary.

A long-term reference picture may be cleared from a memory and/or buffer in response to decoding a RAP picture. For example, the first long term reference picture 216 may be cleared from memory in response to decoding the second RAP picture 226. Long-term reference pictures may also be cleared from a memory and/or in response to decoding a later occurring content segment. For example, decoding an IDR picture, a long term reference picture, or any other event triggered in response to accessing a segment of multi-media content may clear the memory of a previously decoded and stored long-term reference pictures.

Figure 3:
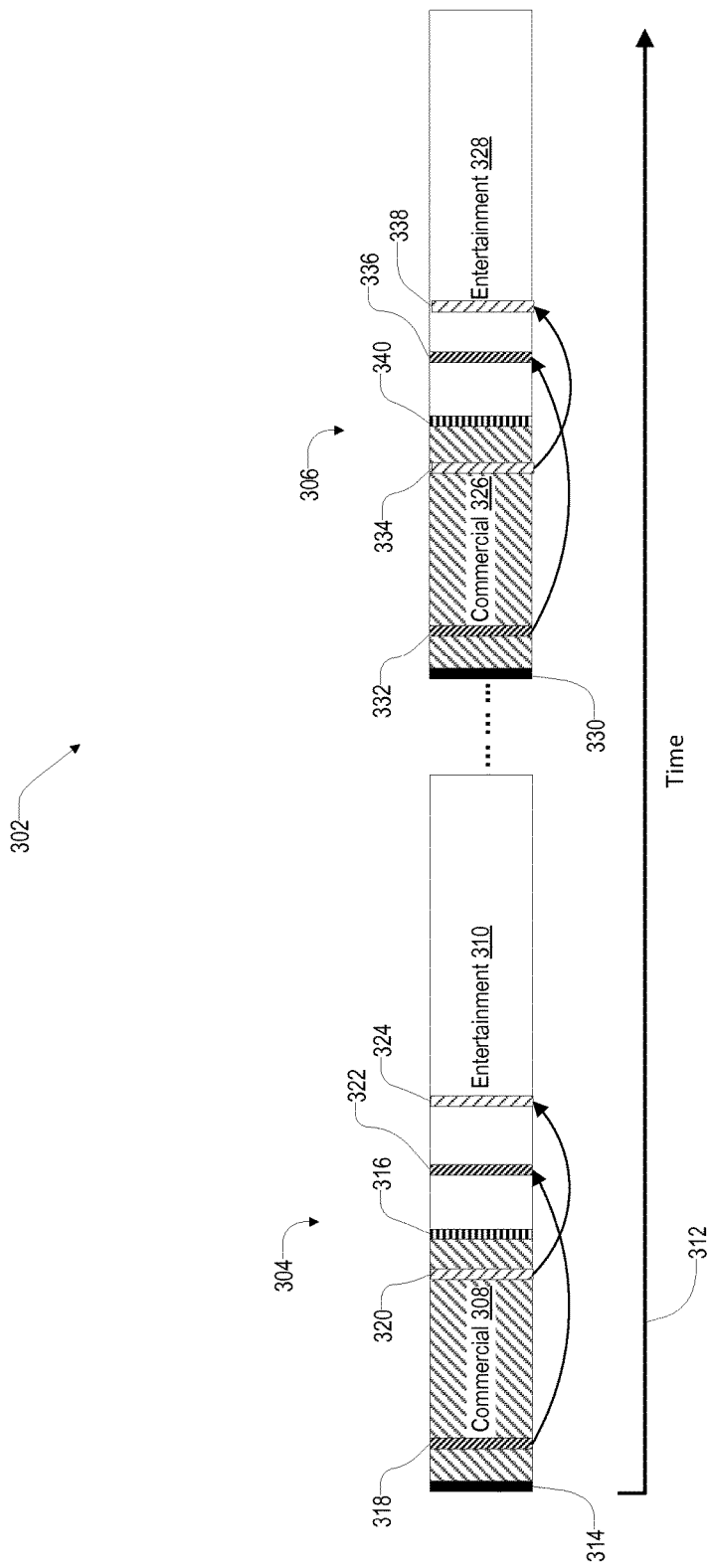
FIG. 3 is an example of a diagram illustrating a method of commercial enforcement in multimedia content.

FIG. 3 is an example of diagram illustrating a method of commercial enforcement of multimedia content 302 in accordance with the disclosure. The multimedia content 302 may comprise a first multimedia content segment 304 and a second multimedia content segment 306. The first multimedia content segment 304 may comprise a commercial segment 308 and an entertainment segment 310 shown relative to a timeline 312. A RAP 314 may be inserted at the beginning of the commercial segment 308. The RAP 314 may provide a playback location where a viewer may access the first multimedia content segment 304. A viewer may be required to watch the commercial segment 308 for a required period of time in order to watch the entertainment segment without interruption.

In some implementations, a first I-picture 316 may be inserted at the beginning of the entertainment segment 310. The I-picture 316 may allow a viewer to skip a portion of the commercial segment 308. By placing the I-picture 316 at the beginning of the entertainment segment 310, the first multimedia content segment 304 may be accessed by a viewer at the beginning of the entertainment segment 310. However, similar to the implementation discussed in reference to FIG. 2, one or more long-term reference pictures may be inserted in the commercial segment 308 to limit or prevent skipping the commercial segment 308.

The period of time required for viewing the commercial segment may be determined based on a position of insertion of one or more reference pictures. In some implementations a first long-term reference picture 318 may be inserted into the commercial segment 308 at a first time. A second long-term reference 320 picture may be inserted into the commercial segment 308 at a second time. The time required for viewing the commercial segment 308 may vary in response to the positions of the first long-term reference picture 318 and the second long-term reference picture 320 relative to the timeline 312. The positions of the first long-term reference picture 318 and the second long-term reference picture 320 relative to the timeline 312 may vary.

The first long-term reference picture 318 may be referenced by one or more dependent pictures in the entertainment segment 310. For example, a first dependent picture 322 may comprise a P-picture or B-picture that requires information from the first long-term reference picture 318 to be reconstructed. When viewing the first multimedia content segment 304, the first dependent picture 322, may require reference information from the first long-term reference picture 318. Dependent pictures requirement the second long-term reference picture 320 may also be referenced by one or more dependent pictures in the entertainment segment 310. For example, a second dependent picture 324 may comprise a P-picture or B-picture that requires information from the second long-term reference picture 320 to be reconstructed.

In some implementations, the first dependent picture 322 and/or the second dependent picture 324 may comprise non-reference dependent pictures that do not serve as reference information from other pictures for decoding to continue playback. A non-reference dependent picture that does not propagate reconstruction errors to other pictures during reconstruction may result in one or more errors during playback. The one or more errors in playback may result in a distorted or blurred picture being displayed as a result of reconstructing the non-reference dependent picture.

For example, a non-reference dependent picture may comprise a non-reference P-picture or B-picture. An attempt to decode a non-reference dependent picture may cause an error in decoding the entertainment segment 310. A non-reference dependent picture may differ from a reference dependent picture that serves as reference information to continue decoding a video stream. For example, a decoder may halt playback of an entertainment segment of multimedia content in response to decoding a reference dependent picture when reference information is unavailable (e.g. not stored in memory). The decoder may display a distorted picture that may be missing reference information during playback of an entertainment segment of multimedia content in response to decoding a non-reference dependent picture when reference information is unavailable The reference information may be unavailable due to a commercial segment including a long-term reference picture being skipped. For clarity, dependent pictures that serve as reference information for one or more pictures to continue playback may be referred to as reference dependent pictures hereinafter.

A decoding error caused by attempting to decode a non-reference dependent picture may not propagate to other pictures. For example, an attempt to decode a non-reference dependent picture 324 without reference information from the long term reference picture 320 may cause the non-reference dependent picture 324 to be displayed as a distorted picture. An attempt to access a reference dependent picture without reference information from a referenced picture may result in a playback failure of media content as reconstruction errors in the reference dependent picture propagate to other pictures.

The inclusion of one or more non-reference dependent pictures may cause an entertainment segment (e.g. entertainment segment 310) to appear distorted when displaying one or more non-reference dependent pictures (e.g. dependent pictures 322 and/or 324). A viewer of the multimedia content 302 may be notified that viewing the commercial segment 308 is required for viewing the entertainment segment 310 similar to the implementation discussed in reference to FIG. 2. A viewer may be notified that skipping a commercial segment is not allowed by displaying a message during the commercial segment 304 until a required time has elapsed.

A message may also be displayed in response to an attempt to decode a non-reference dependent picture (e.g. 324) without first decoding a long-term reference picture (e.g. 320). For example, a viewer may be notified with a message stating, "You have not watched enough of the last commercial. Please return to the previous commercial segment and watch the commercial in its entirety to avoid this message." Including one or more non-reference dependent pictures in an entertainment segment may cause playback of the entertainment segment to be temporarily interrupted. Interruptions may be increased in frequency by including additional non-reference dependent pictures. In this way, a viewer may be urged to watch a commercial segment in its entirety prior to watching an entertainment segment.

The second multimedia content segment 306 may comprise a commercial segment 326 and an entertainment segment 328. Similar to the first multimedia content segment 304 a RAP 330 may be inserted at the beginning of the commercial segment. A first long-term reference picture 332 and a second long-term reference picture 334 may also be inserted in the commercial segment 326. The long term reference pictures 332, 334 may include reference information that is required to decode at least one dependent picture.

A first dependent picture 336 and a second dependent picture 338 may be inserted in the entertainment segment. In some implementations, each of the first dependent picture 336 and the second dependent picture 338 may comprise reference dependent pictures or non-reference dependent pictures. The second multimedia content segment 328 may further comprise an I-picture 340 that may provide an access point for a viewer to skip a portion of the commercial segment 326. Though the multimedia content 302 in this example is shown as first and second multimedia content segments, the number of multimedia content segments may vary.

Figure 4:
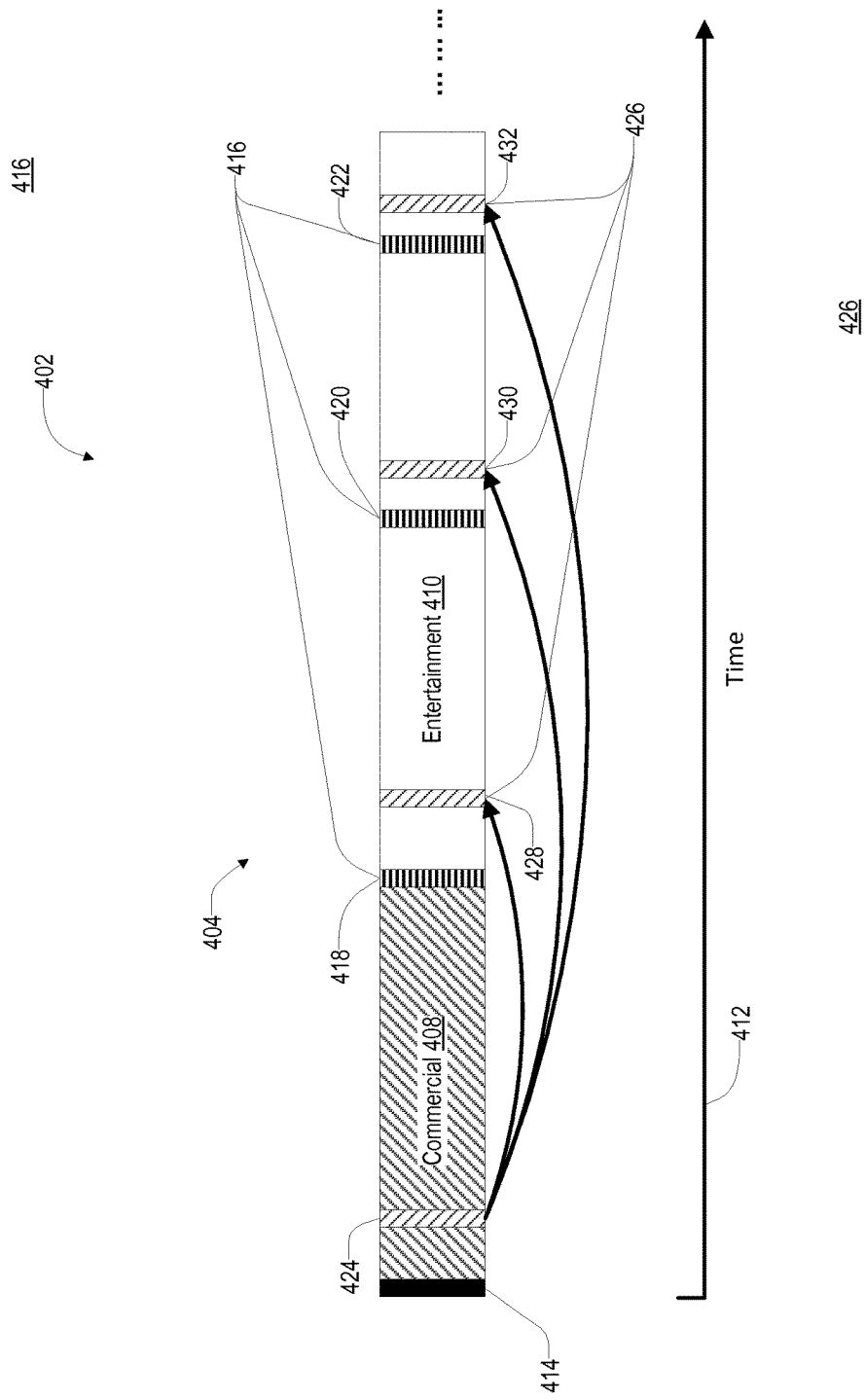
FIG. 4 is an example of a diagram illustrating a method of commercial enforcement in multimedia content.

FIG. 4 is an example of diagram illustrating a method of commercial enforcement in multimedia content 402 in accordance with the disclosure. The multimedia content 402 may comprise a first multimedia content segment 404. The first multimedia content segment 404 may comprise a commercial segment 408 and entertainment segment 410 shown relative to a timeline 412. A RAP 414 may be inserted at the beginning of the commercial segment 408. The RAP 414 may provide a playback location where a viewer may access the first multimedia content segment 404.

In some implementations, a plurality of I-pictures 416 may be inserted periodically throughout the entertainment segment 410. The plurality of I-pictures 416 may comprise a first I-picture 418, a second I-picture 420, and a third I-picture 422. Each of the plurality of I-pictures 416 may allow a viewer to skip a portion of the commercial segment 408 and the entertainment segment 410. By inserting the plurality of I-pictures 416 periodically throughout the entertainment segment 410, a viewer may selectively access various portions of the entertainment segment 410.

At least one long-term reference picture 424 may be inserted in the commercial segment 408. The at least one long-term reference picture 424 may be referenced by a plurality of dependent pictures 426. The at least one long-term reference picture 424 may be inserted at any location in the commercial segment 408 relative to the timeline 412. The long-term reference picture 424 and the corresponding plurality of dependent pictures 426 may provide for skipping to different locations in the entertainment segment 410 while requiring that a viewer watch at least a portion of the commercial segment 408.

The plurality of dependent pictures 426 may comprise a first dependent picture 428, a second dependent picture 430, and a third dependent picture 432. Each of the plurality of dependent pictures 426 may be inserted in the entertainment segment 410 after an I-picture 418, 420, 422 with respect to the timeline 412. Each of the plurality of dependent pictures 426 may comprise a non-reference dependent picture or a reference dependent picture.

As previously discussed, a non-reference dependent picture that is accessed without reference information from a long-term reference picture (e.g. long-term reference picture 424) may cause a decoding error. A decoding error resulting from a non-reference dependent picture may include a distorted picture being displayed to a viewer. The distorted picture may result from the non-reference dependent picture failing to access reference information. A failure to access reference information for a non-reference dependent picture may not result halting playback, but may result in portions of the non-reference dependent picture to be missing and/or distorted when displayed.

An error generated from a reference dependent picture may cause playback of multimedia content to halt or significantly interrupt playback of an entertainment segment. An error resulting from a reference dependent picture may be more significant than that of a non-reference dependent picture. For example, an attempt to reconstruct a reference dependent picture without reference information may halt playback due to reconstruction errors propagating to other pictures. A reference dependent picture may require reference information to continue playback of multimedia content.

As demonstrated in FIGS. 1-3, the multimedia content 402 may comprise a plurality or multimedia content segments. In some implementations, the plurality of multimedia content segments may comprise a plurality of methods for enforcement of viewing a plurality of commercial segments. The various methods discussed throughout the application may be combined in various ways to provide for enforced viewing of commercial content in multimedia content.

Figure 5:
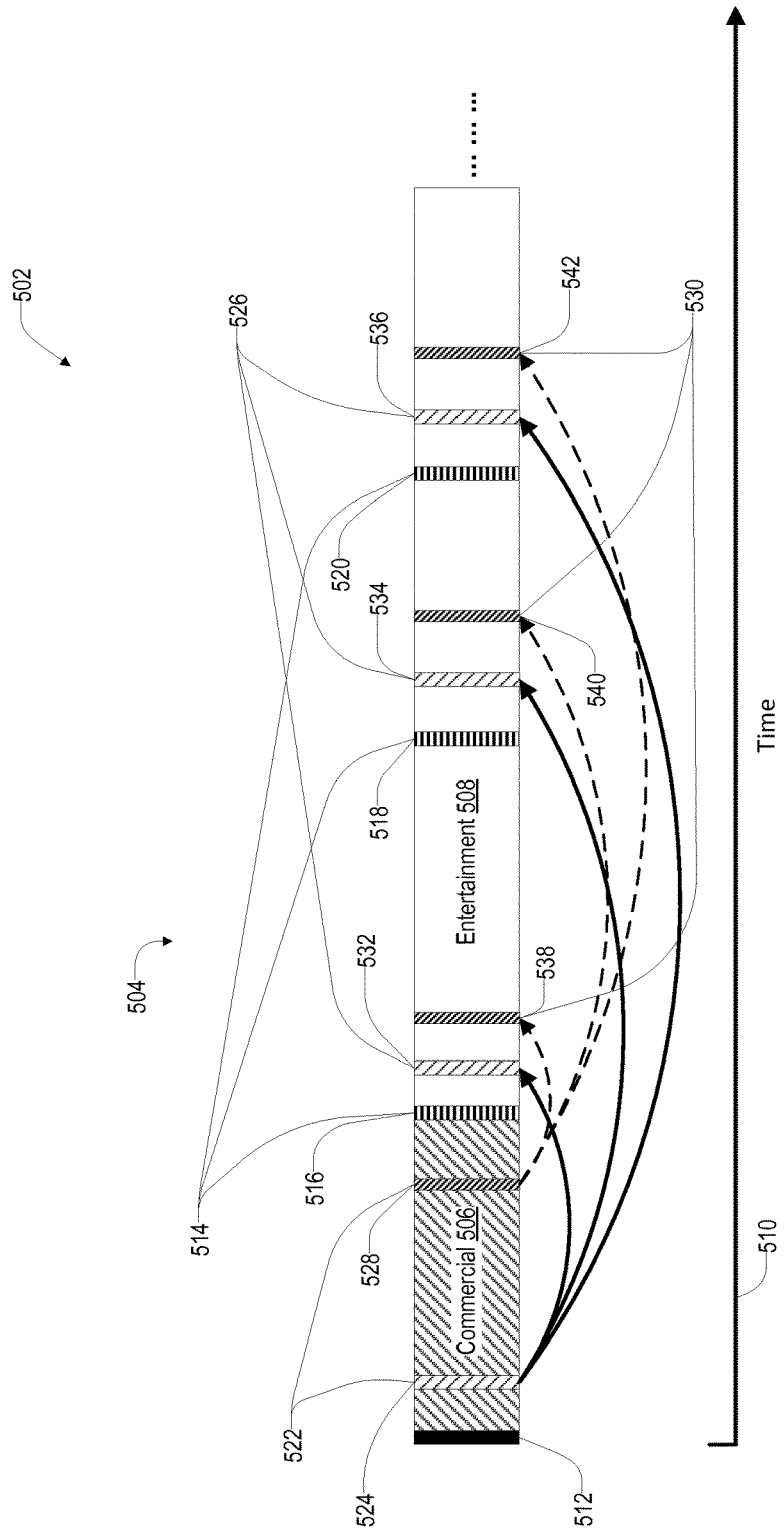
FIG. 5 is an example of a diagram illustrating a method of commercial enforcement in multimedia content.

FIG. 5 is an example of a diagram illustrating a method of commercial enforcement in multimedia content 502 in accordance with the disclosure. The multimedia content 502 may comprise a first multimedia content segment 504. The first multimedia segment 504 may be representative of a plurality of multimedia segments of the multimedia content 502. Each of the plurality of multimedia segments may correspond to a portion of the multimedia content 502 and may comprise at least one commercial segment and at least one entertainment segment.

The first multimedia content segment 504 may comprise a commercial segment 506 and entertainment segment 508 shown relative to a timeline 510. A RAP 512 may be inserted at the beginning of the commercial segment 506. The RAP 512 may provide a playback location where a viewer may access the first multimedia content segment 504.

In some implementations, a plurality of I-pictures 514 may be inserted periodically throughout the entertainment segment 508. The plurality of I-pictures 514 may comprise a first I-picture 516, a second I-picture 518, and a third I-picture 520. Each of the plurality of I-pictures 514 may allow a viewer to skip a portion of the commercial segment 506 and the entertainment segment 508.

A plurality of long-term reference pictures 522 may be inserted in the commercial segment 508. Each of the plurality of long-term reference pictures 522 may be referenced by a plurality of dependent pictures. A first long-term reference picture 524 may be referenced by a first plurality of dependent pictures 526 and a second long term reference picture 528 may be referenced by a second plurality of dependent pictures 530.

The first plurality of dependent pictures 526 may comprise a first dependent picture 532, a second dependent picture 534, and a third dependent picture 536. Each of the first plurality of dependent pictures 526 may be inserted in the entertainment segment 508 after an I-picture 516, 518, 520 relative to the timeline 510. Each of the first plurality of dependent pictures 526 may comprise a non-reference dependent picture or a reference dependent picture.

The second plurality of dependent pictures 530 may comprise a first dependent picture 538, a second dependent picture 540, and a third dependent picture 542. Each of the second plurality of dependent pictures 530 may be inserted in the entertainment segment 508 after an I-picture 516, 518, 520 with respect to the timeline 510. Each of the second plurality of dependent pictures 526 may comprise a non-reference dependent picture or a reference dependent picture.

Figure 6:
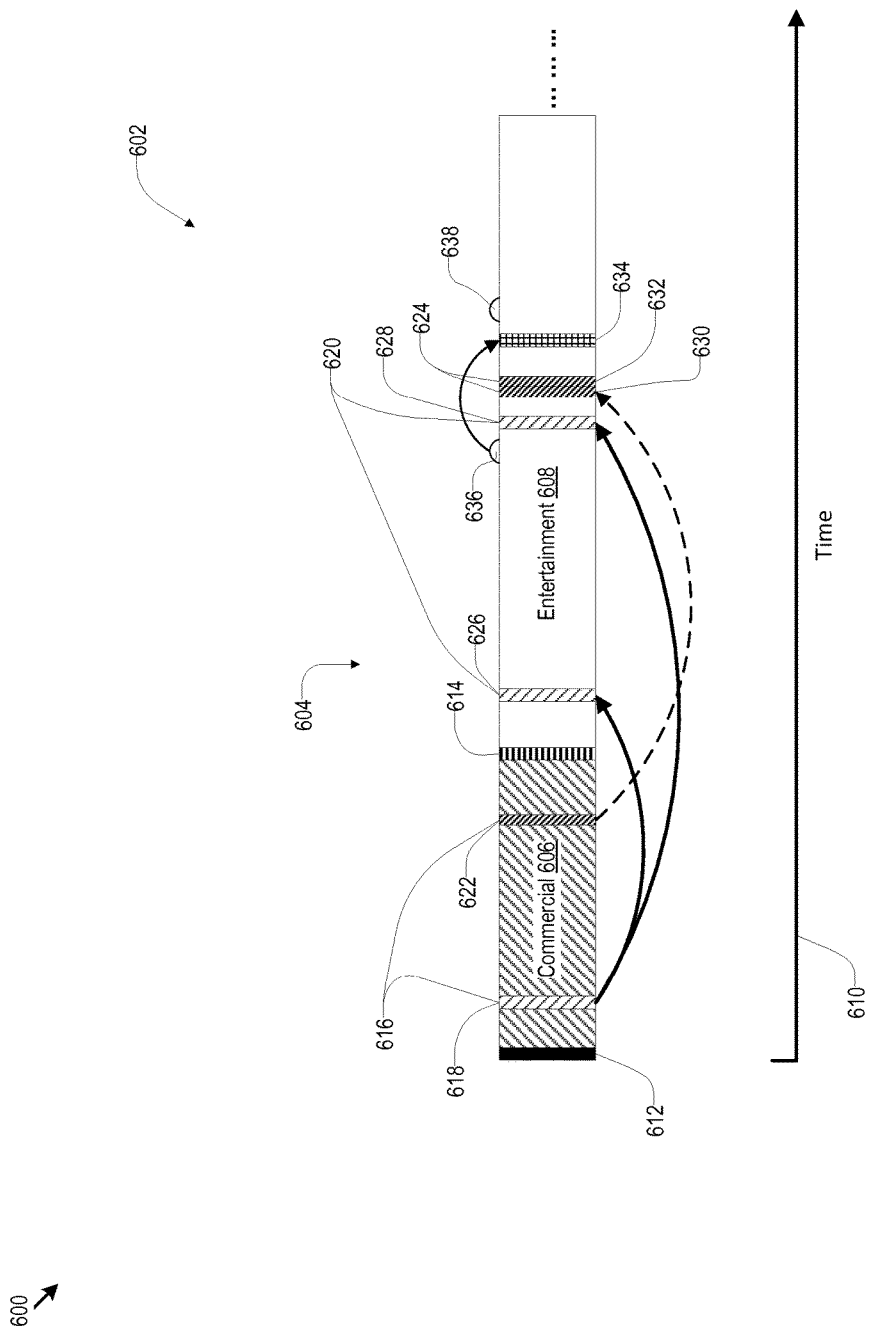
FIG. 6 is an example of a diagram illustrating a method of commercial enforcement in multimedia content.

FIG. 6 is an example of diagram illustrating a method of commercial enforcement in multimedia content 602 in accordance with the disclosure. The multimedia content 602 may comprise a first multimedia content segment 604. The first multimedia segment 604 may be representative of a plurality of multimedia segments. Each of the plurality of multimedia segments may correspond to a portion of the multimedia content 602 and may comprise at least one commercial segment and at least one entertainment segment.

The first multimedia content segment 604 may comprise a commercial segment 606 and an entertainment segment 608 shown relative to a timeline 610. A RAP 612 may be inserted at the beginning of the commercial segment 606. The RAP 612 may provide a playback location where a viewer may access the first multimedia content segment 604.

In some implementations, an I-picture 614 may be inserted at the beginning of the entertainment segment 608. By inserting the I-picture 614 at the beginning of the entertainment segment 608, the first multimedia content segment 604 may be accessed by a viewer at the beginning of the entertainment segment 608. Though a single I-picture is discussed in reference to FIG. 6, a plurality of I-pictures may be inserted in an entertainment segment 608, similar to the example shown in FIG. 5.

A plurality of long-term reference pictures 616 may be inserted in the commercial segment 606. Each of the plurality of long-term reference pictures 616 may be referenced by a plurality of dependent pictures. A first long-term reference picture 618 may be referenced by a first plurality of dependent pictures 620 and a second long term reference picture 622 may be referenced by a second plurality of dependent pictures 624.

The first plurality of dependent pictures 620 may comprise any number of dependent pictures, for example a first dependent picture 626 and a second dependent picture 628. Each of the first plurality of dependent pictures 620 may comprise a non-reference dependent picture or a reference dependent picture. For example, the first plurality of dependent pictures 620 may comprise reference dependent pictures that require reference information for viewing and/or decoding. In this way, a viewer may be required to watch the commercial segment 606 including the first long-term reference picture in order to watch the entertainment portion beyond any of the first plurality of dependent pictures 620 with respect to the timeline 610.

The second plurality of dependent pictures 624 may comprise any number of dependent pictures. Each of the second plurality of dependent pictures 624 may comprise a non-reference dependent picture or a reference dependent picture. For example, the second plurality of dependent pictures 624 may comprise a first non-reference dependent picture 630 and a second non-reference dependent picture 632. The plurality of non-reference dependent pictures 624 may cause a viewer to experience a distorted picture corresponding to reconstructing each of the dependent pictures 624 without reference information from the second long term reference picture 622. The distorted picture may be avoided by decoding the second long term reference picture before decoding and reconstructing the dependent pictures 624.

FIG. 6 may demonstrate the first non-reference dependent picture 630 and the second non-reference dependent picture 632 may be provided in consecutive or temporally similar times. For example, the second plurality of dependent pictures 624 may be inserted in the entertainment segment 608 consecutively and/or intermittently over any period of time (e.g. 0.1 to 120 seconds). Non-reference dependent pictures may be inserted over a substantial portion (e.g. 5% to 90%) of an entertainment segment as a plurality of pictures that may represent the entertainment segment. In this way a viewer may experience a significant viewing discomfort due to decoding errors when viewing the entertainment segment 608. The decoding errors may be a result of attempting to reconstruct the second plurality of dependent pictures 624 without reference information from the second long-term reference picture 622.

A viewer of the multimedia content 602 may be notified that a commercial segment is required for viewing in a variety of ways. In some examples a message may be included in a commercial segment warning a viewer that an attempt to skip commercial segment prior to a required viewing time may result in failure of playback of an entertainment segment 608 of the multimedia content 602. In some instances a message, subtitle, dialog box, symbol, timer, or any other notification may be displayed prior to or in conjunction a commercial or entertainment segment of the multimedia content. For example, a viewer may be notified that skipping a commercial segment is not allowed in a message displayed until a time has elapsed. In this way, a viewer may be notified if and when a commercial segment may be skipped.

A notification that a commercial segment is required for viewing may be included in the pictures as delivered to a decoder. Such a notification may also be delivered as side information in a video stream delivered to a decoder system. Side information received by a system for decoding may be rendered by graphics processor and displayed during playback as rendered graphics. An example of a system that may be implemented for decoding and rendering of a video stream is shown in FIG. 11.

A dependent picture 634 may be inserted in the entertainment segment 608. The dependent picture 634 may reference at least one recovery picture 636. The recovery picture 636 may precede the second plurality of dependent pictures 624 in time relative to the timeline 610. The dependent picture 634 may reference the recovery picture 636 to correct any decoding errors generated by decoding the second plurality of dependent pictures 624 without reference information from the second dependent picture 622. For example, the dependent picture 634 may reference the at least one recovery picture 636 to ensure that a plurality of future pictures 638 are reconstructed without perpetuating the previous decoding errors.

Figure 7:
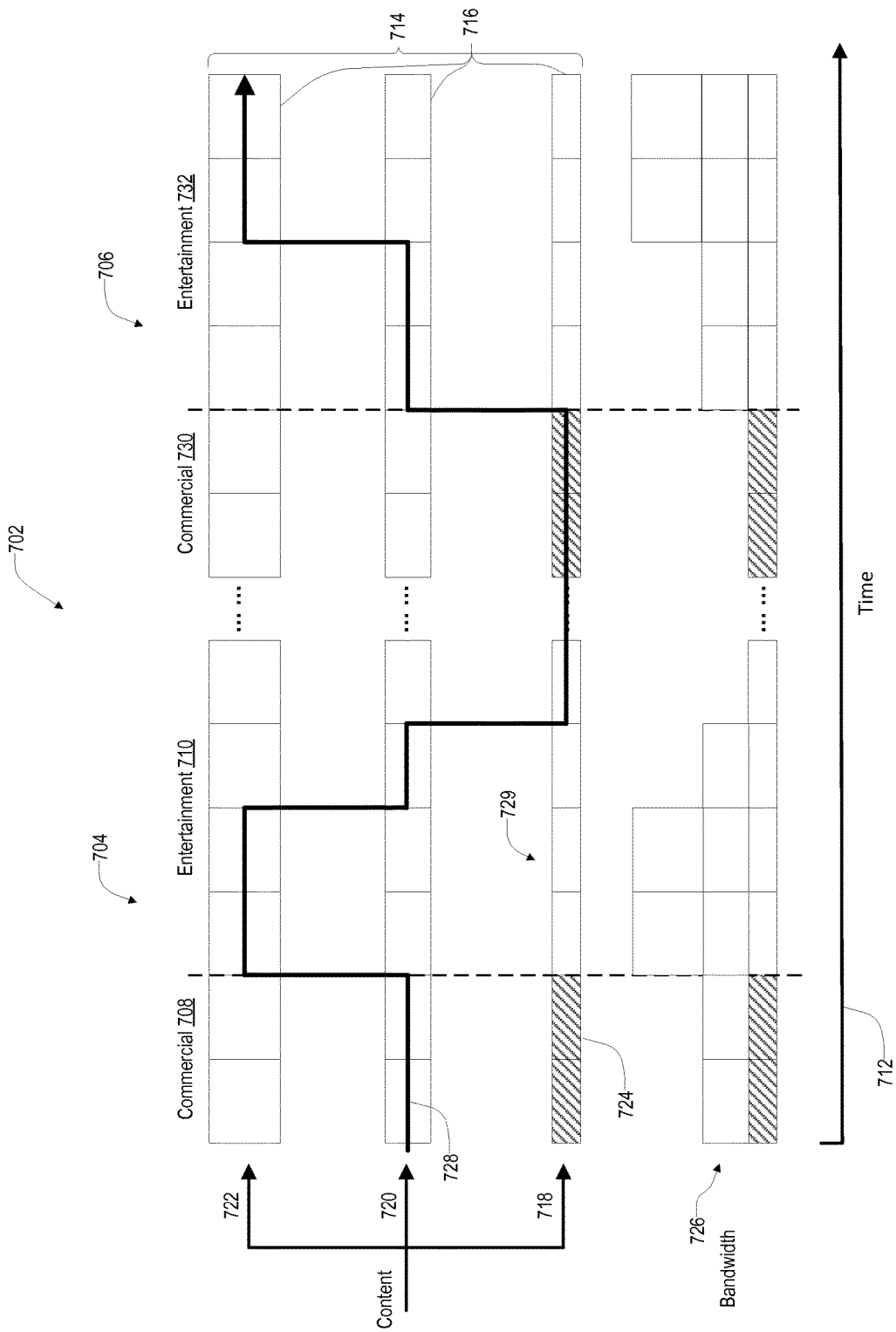
FIG. 7 is an example of a diagram illustrating a method of commercial enforcement in multimedia content in an adaptive bit-rate (ABR) environment.

FIG. 7 is an example of diagram illustrating a method of commercial enforcement in multimedia content 702 in an adaptive bit-rate (ABR) environment in accordance with the disclosure. In some implementations, the methods described in reference to FIGS. 1-6 may be applied to require a viewer to watch at least a portion of a commercial segment in an ABR bit-stream. The multimedia content 702 shown in FIG. 7 may comprise a first multimedia content segment 704 and a second multimedia content segment 706. Each of the similarly described elements of the multimedia content discussed in reference to FIG. 7 may correspond to like elements in FIGS. 1-6.

The first multimedia content segment 704 may comprise a commercial segment 708 and an entertainment segment 710 shown relative to a timeline 712. In some implementations, a viewer may be required to watch the commercial segment 708 for a required period of time. The period of time required for viewing the commercial segment may be determined based on a position of insertion of one or more reference pictures relative to the timeline 712.

Enforcement of commercial advertisements in an ABR environment may be implemented by applying at least one of the methods introduced in FIGS. 1-6 to one or more layers of a scalable video coding (SVC) stream 714. The SVC stream 714 may comprise a plurality of scalable layers 716. The SVC stream 714 may comprise any number of scalable layers. In some implementations, the SVC stream may comprise a base layer 718, a first enhancement layer 720, and a second enhancement layer 722.

The base layer 718 may comprise a first fidelity level (e.g. 480p@30 at 0.5 Mbps). Each of the first enhancement layer 720 and the second enhancement layer 722 may be coded with a scalable coding method (e.g. spatial scalability, signal-to-noise ratio (SNR) scalability, temporal scalability or combined scalability). The base layer may be applied as a reference layer for the first enhancement layer 720 and the second enhancement layer 722 to generate a first enhanced fidelity and a second enhanced fidelity, respectively.

The first enhancement layer 720 may be operable to scale the base layer to a first enhanced fidelity (e.g. 720p@30 at 1 Mbps). The second enhancement layer 722 may be operable to scale the base layer to a second enhanced fidelity (e.g. 1080p@30 at 2 Mbps). The first enhancement layer 720 and the base layer 718 may be reference by the second enhancement layer 722 to generate the second enhanced fidelity. Though specific examples of fidelity, quality, and/or bit-rate may be discussed herein, the plurality of scalable layers 716 may correspond to any number of layers. Each layer may further correspond to any fidelity level and/or bit-rate.

In some implementations, the commercial segment 724 of the base layer 718 may comprise one or more long term reference pictures. For example, the commercial segment 724 may comprise at least one long-term reference picture similar to one or any combination of the commercial segments 108, 208, 308, 408, 506, and/or 606. One or more dependent pictures in an entertainment segment may reference the one or more long term reference pictures in the commercial segment.

An interdependency of the plurality of scalable layers 716 may be implemented to enforce viewing of at least a portion of a commercial segment. The commercial enforcement may be incorporated by referencing at least one long-term reference picture included in the base layer 718. The first enhancement layer 720 and the second enhancement layer 722 may depend on the base layer 718 for decoding. The interdependency among the base layer 718 and the enhancement layers 720, 722, may cause the commercial enforcement of the base layer 718 to also enforce viewing of at least the portion of a commercial segment in the enhancement layers 720, 722.

When accessing the SVC stream 714 a receiver device, (e.g. a video decoder) may request the base layer 718. The first enhancement layer 720 and the second enhancement layer 722 may further be requested in response to an available bandwidth being sufficient to support a bandwidth usage 726. An example path 728 may demonstrate a transmission from a coding device of one or more of the plurality of scalable layers 716. The coding device may transmit the base layer 718; the base layer 718 and the first enhancement layer 720; or the base layer 718, the first enhancement layer 720, and the second enhancement layer 722. The bandwidth usage 728 may correspond to the transmitted layers of the plurality of scalable layers 716.

In response to a request to receive the SVC stream 714, a coding device may transmit the base layer 718. The base layer 718 may comprise at least one commercial segment 724, for example the commercial segment 708, comprising at least one long-term reference picture. The at least one long-term reference picture may be referred by at least one dependent picture in the entertainment segment 729. The interdependency among the base layer 718, the first enhancement layer 720, and the second enhancement layer 722 may provide for enforcement of at least one commercial segment 708 of the multimedia content 702.

The second multimedia content segment 706 may be similarly arranged to the first multimedia content segment 704. The second multimedia content segment 706 may comprise a commercial segment 730 and an entertainment segment 732. Though a first and second multimedia content segment 704, 706 are discussed herein, the multimedia content 702 may comprise any number of multimedia content segments. A number of multimedia content segments may vary in relation to the length of a multimedia content and/or a frequency of commercial segments incorporated in the multimedia content.

Figure 8:
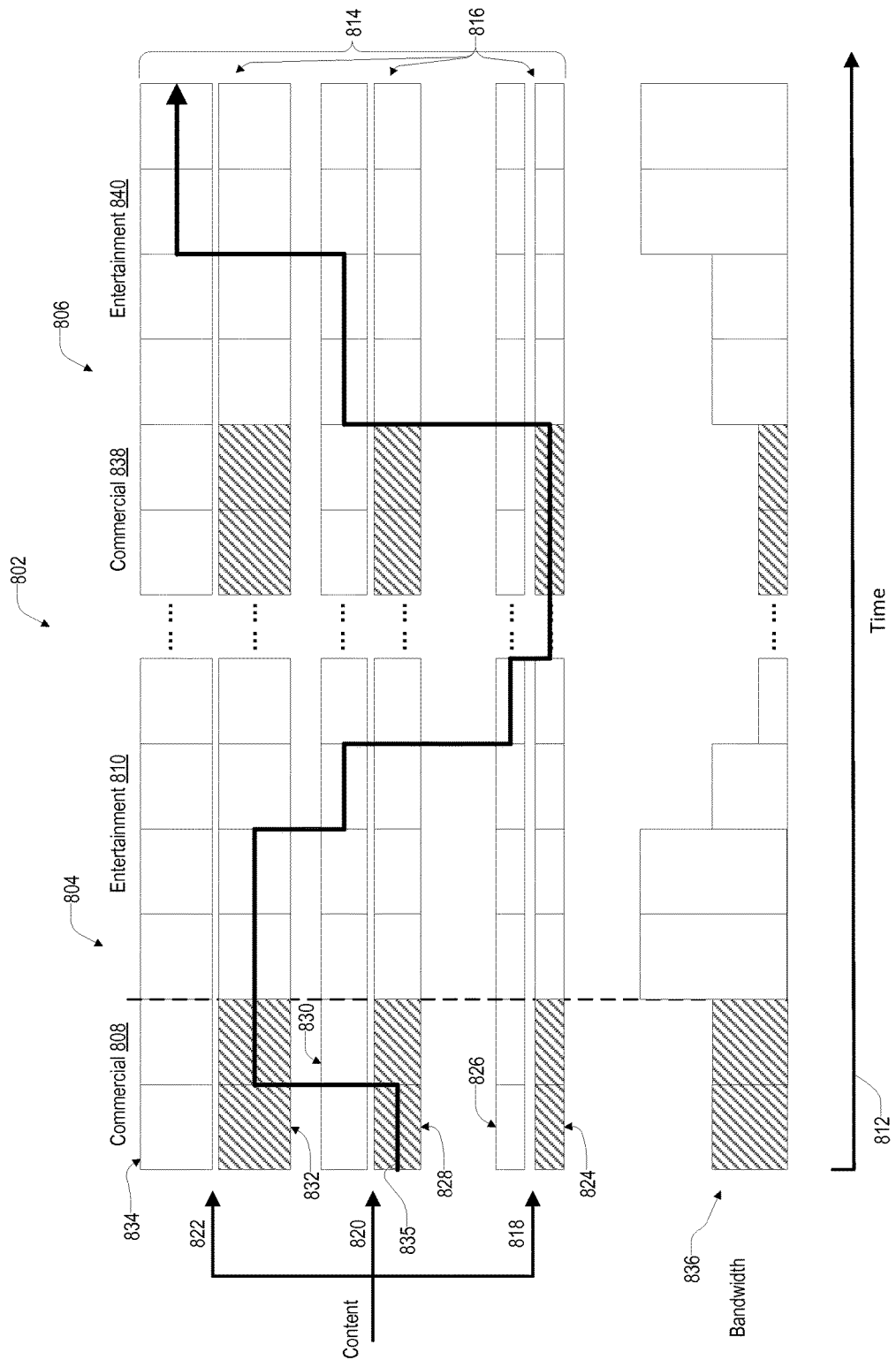
FIG. 8 is an example of a diagram illustrating a method of commercial enforcement in multimedia content in an adaptive bit-rate (ABR) environment.

FIG. 8 is an example of diagram illustrating a method of commercial enforcement in multimedia content in an ABR environment in accordance with the disclosure. In some implementations the methods described in reference to FIGS. 1-6 may be applied to require a viewer to watch at least a portion of a commercial segment in an ABR bitstream. The multimedia content 802 may comprise a first multimedia content segment 804 and a second multimedia content segment 806. Each of the similarly described elements of the multimedia content discussed in reference to FIG. 8 may correspond to like elements in FIGS. 1-6.

The first multimedia content segment 804 may comprise a commercial segment 808 and an entertainment segment 810 shown relative to a timeline 812. In some implementations, a viewer may be required to watch the commercial segment 808 for a required period of time. The period of time required for viewing the commercial segment may be determined based on a position of insertion of one or more long-term reference pictures in the commercial segment 808 relative to the timeline 812.

In some implementations an ABR stream 814 may comprise a plurality of layers 816. The ABR stream 814 may comprise any number of layers. In some implementations, the ABR stream may comprise a first layer 818, a second layer 820, and a third layer 822. The first layer 818 may comprise a first fidelity level (e.g. 480p@30 at 0.5 Mbps). The second layer 820 may comprise a second fidelity level (e.g. 720p@30 at 1 Mbps). The third layer 822 may comprise a third fidelity level (e.g. 1080p@30 at 2 Mbps). Though specific examples of fidelity, quality, and/or bit-rate may be discussed herein, the plurality of layers 816 may correspond to any number of layers. Each layer may further correspond to any fidelity level and/or bit-rate.

One or more of the plurality of layers 816 may comprise a restricted version of the multimedia content 802 and an unrestricted version of the multimedia content 802. In some implementations the first layer 818 may comprise a restricted version 824 and an unrestricted version 826. The second layer 820 may also comprise a restricted version 828 and an unrestricted version 830, and the third layer 822 may comprise a restricted version 832 and an unrestricted version 834. Each of the restricted versions may be similar to the base layer 718 of FIG. 7 in that each may comprise at least one of the method for commercial enforcement introduced in FIGS. 1-6.

Each of the restricted versions 824, 828, and 832 may comprise at least one long-term reference picture and may be similar to one or any combination of the commercial segments 108, 208, 308, 408, 506, and/or 606. When accessing the ABR stream 814, a receiver device, (e.g. a video decoder) may request one of the plurality of layers in response to an available bandwidth. An example path 835 may demonstrate a transmission from a coding device in response to a request from a receiving device. A bandwidth usage 836 may correspond to a transmitted layer of the plurality of layers 816 in response to the request from the receiver device.

A restricted version (e.g. 824, 828, and 832) may be supplied to the receiver device from a coding device in response to a request for the commercial segment 808. An unrestricted version (e.g. 826, 830, and 834) may be supplied to the receiver device from the coding device in response to a request for the entertainment segment 810. In some cases, an available bandwidth may change during a commercial segment, for example commercial segment 808. In response to this occurrence, a coding device may supply a restricted version of the layer corresponding to an available bandwidth (e.g. 824, 828, and 832). The ABR stream 816 may provide for commercial enforcement of the plurality of layers while optimizing the ABR stream 816 to an available bandwidth.

For example, at the beginning of each multimedia content segment (e.g. 804, 806), a restricted copy of the selected layer, determined by bandwidth conditions may be supplied to a decoder from a media head-end (e.g. an encoder). If the bandwidth 836 changes in the middle of the commercial segment, the video stream may be switched by the media-head end to a restricted copy of the selected layer determined by bandwidth conditions. If the bandwidth 836 changes at the end of a commercial segment, or during an entertainment segment the multimedia content segment, the video stream may be switched by the media-head end to an un-restricted copy of the selected layer determined by bandwidth conditions.

The second multimedia content segment 806 may be similarly arranged to the first multimedia content segment 804. The second multimedia content segment 806 may comprise a commercial segment 838 and an entertainment segment 840. Though a first and second multimedia content segment 804, 806 are discussed herein, the multimedia content 802 may comprise any number of multimedia content segments.

Figure 9:
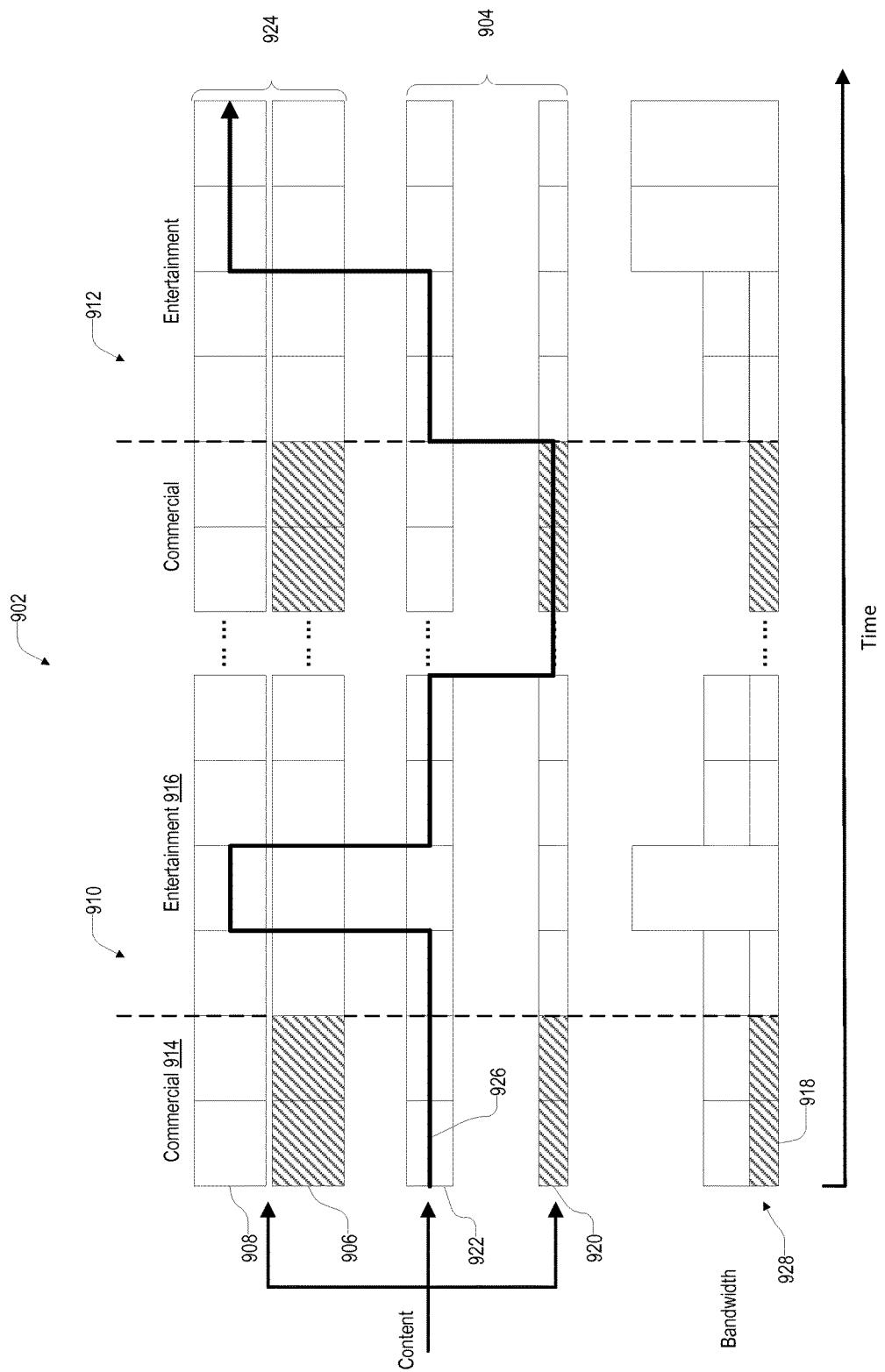
FIG. 9 is an example of a diagram illustrating a method of commercial enforcement in multimedia content in an adaptive bit-rate (ABR) environment.

FIG. 9 is an example of diagram illustrating a method of commercial enforcement in multimedia content 902 in an ABR environment in accordance with the disclosure. In some implementations, a plurality of scalable layers 904 may be used in combination with a restricted version 906 and an unrestricted version 908 to provide an ABR stream with commercial enforcement. The multimedia content 902 may comprise a first multimedia content segment 910 and a second multimedia content segment 912. Each of the similarly described elements of the multimedia content discussed in reference to FIG. 9 may correspond to like elements in FIGS. 1-8.

The first multimedia content segment 910 may comprise a commercial segment 914 and an entertainment segment 916 shown relative to a timeline 918. Each of the plurality of scalable layers 904 may incorporate at least one of the methods introduced in FIGS. 1-6 to enforce viewing of at least a portion of a commercial segment (e.g. 914). In some implementations, a base layer 920 may comprise one or more long-term reference pictures in the commercial segment 914. The one or more reference pictures may be referenced by at least one dependent picture in the entertainment segment 916 to provide for commercial enforcement when decoding/reconstructing the multimedia content 902.

An enhancement layer 922 may be combined with the base layer 920 to generate a SVC stream having an increased fidelity. The enhancement layer 922 may be similar to the enhancement layers 720 and 722 in FIG. 7. An interdependency of the base layer and the enhancement layer 922 may be applied to enforce viewing of at least a portion of a commercial segment. For example, when streaming the enhanced layer 922 and the base layer 920, the commercial enforcement may be applied to the enhancement layer 922 from the base layer 920 through a SVC dependency.

The restricted version 906 or the unrestricted version 908 may further be provided to a receiver device. The restricted version 906 and the unrestricted version 908 may define a dual copy layer 924. The dual copy layer may comprise a layer having a different fidelity and/or bit-rate than the base layer 920 and the enhancement layer 922. For example, the base layer 920 may comprise a first fidelity level, the base layer 920 combined with the enhancement layer 922 may comprise a second fidelity level, and the dual copy layer 924 may comprise a third fidelity level. Each of the fidelity levels discussed herein may vary depending on a particular application may comprise, for example 720×480, 1280×720, 1920×1080, 3840×2160, 8 k×4 k as well as other standard and non-standard video resolutions.

In response to a request from a receiver device, the restricted version 906 or the unrestricted version 908 of the dual copy layer 924 may be generated by a coding device. The coding device may then deliver the restricted version 906 or the unrestricted version 908 to the receiver device. An example path 926 may demonstrate a transmission from a coding device in response to a request from a receiving device. A bandwidth usage 928 may correspond to a layer supplied to a receiver device.

A coding device may deliver one or more of the plurality of scalable layers 904 or one of the versions (e.g. 906 or 908) of the dual copy layer 924 to a receiver device. The delivery may be generated in response to a request for a bit-rate stream corresponding to a fidelity and/or bandwidth usage 928. By providing various layers, an ABR stream may be provided to a receiver device while maintaining enforcement of at least a portion of a commercial segment.

FIG. 10 is an example of a block diagram of a system 1002 for generating multimedia content for commercial enforcement. The system 1002 may comprise a frame processor 1004, a memory 1006, a video frame compiler 1008 and an encoder 1010. In some implementations, the system 1002 may comprise a media head-end. The media head-end may be operable to supply a video stream comprising a plurality of layers to a decoding device in response to an available bandwidth. The memory 1006 may comprise a buffer or any other form of memory, for example, random access memory (RAM), dynamic RAM (DRAM), synchronous DRAM (SDRAM), and other forms of memory configured to store digital information.

The frame processor 1004 may be configured to retrieve commercial content 1012 and entertainment content 1014 and store the multimedia content in memory 1006. The memory 1006 may have sufficient capacity to store a plurality of buffered pictures and/or video frames corresponding to at least a portion of the multimedia content. The video frame compiler 1008 may retrieve pictures corresponding to pictures and/or video frames of the multimedia content from memory and supply the pictures and/or video frames to the encoder 1010. The encoder 1010 may insert one or more long-term reference pictures in at least one commercial segment. The encoder 1010 may also insert one or more dependent pictures in at least one entertainment segment. The dependent pictures may reference the one or more long-term reference pictures to provide commercial enforcement to the multimedia content generated by the encoder 1010.

Referring now to FIG. 11, an example a block diagram of a system 1102 for decoding multimedia content is shown in accordance with the disclosure. The system 1102 may generally comprise a decoder 1104 and memory 1106. The decoder 1104 may be operable to receive a video stream comprising coded video. The coded video may comprise multimedia content coded by an encoder. The coded video may further comprise at least one commercial segment and at least one entertainment segment. Upon receipt of multimedia content, the decoder 1104 may buffer the multimedia content to the memory 1106. The memory 1106 may comprise any form of memory operable to store digital information, for example, random access memory (RAM), dynamic RAM (DRAM), synchronous DRAM (SDRAM), etc.

The decoder 1104 may be operable to decode a plurality of pictures comprising one or more long-term reference pictures in at least one commercial segment. The decoder 1104 may further be operable to decode one or more dependent pictures in the at least one entertainment segment. The dependent pictures may reference the one or more long-term reference pictures to provide commercial enforcement for the multimedia content. The long term reference pictures may be stored in the memory 1106 to be referenced during reconstruction of the one or more dependent pictures during decoding.

The system 1102 may further comprise a video scaler 1108, a graphics rendering engine 1110, and a compositor 1112. The video scaler 1108 may be operable to receive and scale a plurality of decoded pictures from the decoder 1104. The graphics rendering engine 1110 may be operable to render graphics that may be received in the video stream. For example, the graphics rendering engine 1110 may be operable to generate a message, subtitle, dialog box, symbol, timer, or any other notification for display prior to or in conjunction a commercial or entertainment segment of the multimedia content.

The compositor 1112 may be operable to receive the plurality of decoded pictures from the video scaler 1108 and the rendered graphics from the graphics rendering engine 1110. The compositor 1112 may combine the rendered graphics with the plurality of decoded pictures to generate a video feed. The compositor may output the video feed from via an audio/video output to a display device 1114. For example, the video feed may be output through a coaxial connection, high definition multimedia interface (HDMI), component audio/video connection, etc. The video feed may then be displayed on the display device to require viewing at least one commercial segment in order to view at least one entertainment segment of the multimedia content.

The methods and devices described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system or device may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

Various implementations have been specifically described. However, many other implementations are also possible.

What is claimed is:

1. A method for decoding multimedia content, the method comprising:
accessing at least one commercial segment comprising at least one reference i-picture;
storing the at least one reference i-picture in memory; and
generating a decoded at least one entertainment segment, the at least one entertainment segment being temporally subsequent to the commercial segment, the at least one entertainment segment comprising an entertainment reference i-picture and at least one dependent picture, the at least one dependent picture being subsequent to the entertainment reference i-picture and the entertainment reference i-picture being subsequent to the at least one reference i-picture in the commercial segment, wherein the at least one dependent picture in the at least one entertainment segment references information from the at least one reference i-picture in the commercial segment for coding, the at least one dependent picture being contained in an enhancement layer, wherein the at least one reference i-picture is a long-term reference picture and is maintained in the memory after subsequent reference i-pictures are accessed until a clear command is received; and
accessing the decoded at least one entertainment segment.

2. The method according to claim 1, wherein the at least one dependent picture is a non-reference dependent picture.

3. The method according to claim 2, wherein the commercial segment comprises a subtitle temporally prior to the reference i-picture in the commercial segment.

4. The method according to claim 3, wherein the subtitle warns a viewer of an interruption in multimedia playback in response to skipping a portion of the at least one commercial segment.

5. The method according to claim 1, wherein the at least one dependent picture is a reference dependent picture.

6. The method according to claim 5, wherein the reference dependent picture requires access to the at least one reference picture to generate the decoded the at least one entertainment segment.

7. The method according to claim 1, wherein the commercial segment comprises a random access point operable to provide access as a playback position in the multimedia content.

8. A system for encoding multimedia content, the system comprising:
at least one processor operable to:
access a commercial segment;
access an entertainment segment;
insert at least one reference i-picture in the commercial segment;
insert a plurality of dependent pictures in the entertainment segment; and
generate an encoded video stream comprising the commercial segment and the entertainment segment, the entertainment segment being temporally subsequent to the commercial segment, the entertainment segment comprising an entertainment reference i-picture and the plurality of dependent pictures, the plurality of dependent pictures being subsequent to the entertainment reference i-picture and the entertainment reference i-picture being subsequent to the at least one reference i-picture in the commercial segment, wherein the plurality of dependent pictures in the entertainment segment reference the at least one reference i-picture in the commercial segment, the plurality of dependent pictures being contained in an enhancement layer, wherein the at least one reference i-picture is a long-term reference picture configured to be stored throughout decoding of at least one of the plurality of dependent pictures.

9. The system according to claim 8, further comprising a first dependent picture of the plurality of dependent pictures, the first dependent picture comprising a reference to a first reference i-picture of the at least one reference i-picture.

10. The system according to claim 9, further comprising a second dependent picture of the plurality of dependent pictures, the second dependent picture referencing a second reference i-picture of the at least one reference i-picture.

11. The system according to claim 10, wherein commercial segment comprises the first reference picture temporally prior to the second reference i-picture.

12. The system according to claim 8, wherein the multimedia content comprises an intra-picture after the commercial segment and temporally prior to the entertainment segment.

13. The system according to claim 8, wherein the entertainment segment is configured to be interrupted in response to decoding a first dependent picture prior to decoding a first reference i-picture.

14. A device for decoding multimedia content, the device comprising:
at least one processor configured to:
access at least one commercial segment comprising at least one reference i-picture;
store the at least one reference i-picture in memory; and
generate a decoded at least one entertainment segment, the at least one entertainment segment being temporally subsequent to the commercial segment, the at least one entertainment segment comprising an entertainment reference i-picture and at least one dependent picture, the at least one dependent picture being subsequent to the entertainment reference i-picture and the entertainment reference i-picture being subsequent to the at least one reference i-picture in the commercial segment, wherein the at least one dependent picture in the at least one entertainment segment references information from the at least one reference i-picture in the commercial segment for coding, the at least one dependent picture being contained in an enhancement layer, wherein the at least one reference i-picture is a long-term reference picture and is maintained in the memory after subsequent reference i-pictures are accessed until a clear command is received; and
access the decoded at least one entertainment segment.

15. The device of claim 14, wherein the at least one dependent picture is a non-reference dependent picture.

16. The device of claim 15, wherein the commercial segment comprises a subtitle temporally prior to the reference i-picture in the commercial segment.

17. The device of claim 16, wherein the subtitle warns a viewer of an interruption in multimedia playback in response to skipping a portion of the at least one commercial segment.

18. The device of claim 14, wherein the at least one dependent picture is a reference dependent picture.

19. The device of claim 18, wherein the reference dependent picture requires access to the at least one reference picture to generate the decoded the at least one entertainment segment.

20. The device of claim 14, wherein the commercial segment comprises a random access point operable to provide access as a playback position in the multimedia content.

* * * * *